Figure 1:
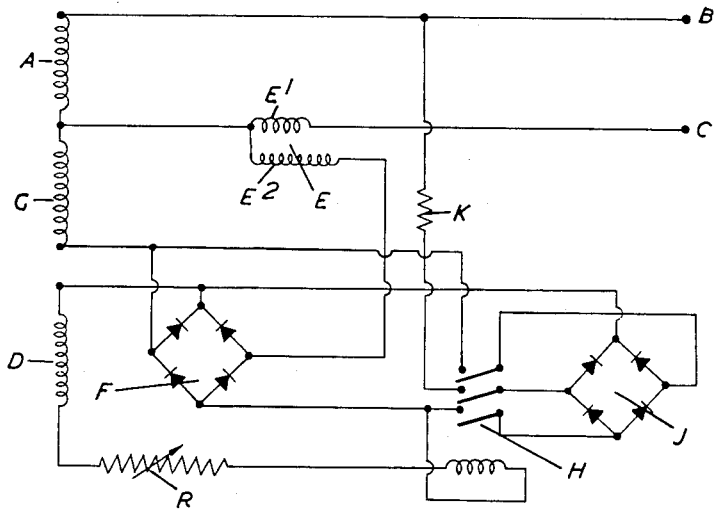

April 17, 1956  E. W. KREBS  2,742,603
SYNCHRONOUS DYNAMO ELECTRIC MACHINES
Filed Dec. 17, 1952  2 Sheets-Sheet 1

Inventor
ERNST W. KREBS
By
Attorney

Inventor
ERNST W. KREBS.
By
Attorney

United States Patent Office 2,742,603
Patented Apr. 17, 1956

2,742,603

SYNCHRONOUS DYNAMO ELECTRIC MACHINES

Ernst Wolfgang Krebs, Purley, England

Application December 17, 1952, Serial No. 326,436

7 Claims. (Cl. 322—25)

This invention relates to synchronous dynamo-electric machines, and is concerned with compensating arrangements for controlling the terminal voltage of alternators with varying load.

This application is a continuation-in-part application of the present applicant's U. S. patent application Serial No. 225,481, filed on May 10, 1951, now abandoned.

When an alternator is running at substantially constant speed and is generating power at unity or lagging power factor, the terminal voltage will fall with increasing load. If the terminal voltage is to be kept constant at constant or slightly falling speed under load, then the direct current excitation must be increased either with increasing load at a given power factor, or with decreasing power factor at a given load, or if both conditions occur simultaneously.

It has already been proposed to employ the combination with an alternator of a rectifier and means for supplying to the rectifier the resultant of two alternating current components, one dependent on the terminal voltage and the other dependent on the load current, differing in phase by a substantial angle at unity power factor, the output from the rectifier being arranged to supply or control the excitation of the machine. It has also been proposed to employ a current transformer to supply the component dependent on the load current, and to obtain the component dependent on terminal voltage either through a voltage transformer connected across the line or direct from the terminals of the machine. Since the current transformer, being inductive, will introduce a phase shift of 90° in its output voltage as compared with the phase of the line current, whereas the voltage transformer will introduce a phase shift at 180° which can be nullified by reversing the terminals of its secondary winding, the desired phase relationship between the two voltage components can be obtained by this means in either case.

However when the alternator is started up, the voltage obtained from the residual magnetism and applied to the rectifier through the normal connections may be insufficient to overcome the internal resistance of the rectifier, so that the excitation may fail to build up. The present invention is concerned with initiating means for ensuring that the necessary excitation current is supplied to the field to enable the excitation to be built up from the residual magnetism when starting.

According to the present invention, there is combined with an alternator a rectifier, a main exciting circuit connected to the rectifier input to supply to the rectifier the resultant of two alternating current components derived from the alternator windings, one dependent on the terminal voltage and the other dependent on the load current, whereof the latter leads the former by a substantial angle in the region of 90 electrical degrees at unity power factor but is approximately in phase with it at zero lagging power factor, and means for employing the output of the rectifier to control the excitation during normal running, and an initiating exciting circuit connected to a source of alternating current derived from the residual magnetism of the alternator and including means for rectifying this current and for then employing it to supply the initiating excitation when starting, the ratio of applied voltage at a given flux to rectifier impedance being greater in the initiating circuit than in the main exciting current to ensure self-excitation, and switch contacts in the initiating circuit for rendering it inoperative as the voltage of the alternator builds up.

The same rectifier may be used in the main exciting circuit and in the initiating circuit. For example, in one such arrangement the initiating circuit, for supplying the initiating excitation when starting, supplies to the rectifier input alternating current derived from the residual magnetism of the alternator at a voltage substantially greater at a given residual flux than that which would be applied to the rectifier input by the main exciting circuit at the same residual flux.

In another such arrangement the rectifier is provided with intermediate tappings which bypass a proportion of its rectifying cells, and the initiating circuit is connected to the intermediate tappings to supply to the alternator field when starting rectified current derived from the residual magnetism of the machine which is passed through only the said proportion of the rectifier cells.

Alternatively the initiating means may include means independent of the main rectifier for deriving a small rectified current from the residual magnetism of the alternator and for causing the said current to supply the initial excitation when starting.

For example, the initiating circuit may include an auxiliary rectifier, of lower voltage rating than the main rectifier, whose input terminals are connected by the initiating circuit to a supply of alternating current derived from the residual magnetism of the alternator, and whose rectified output supplies the initiating excitation when starting.

Figure 2:
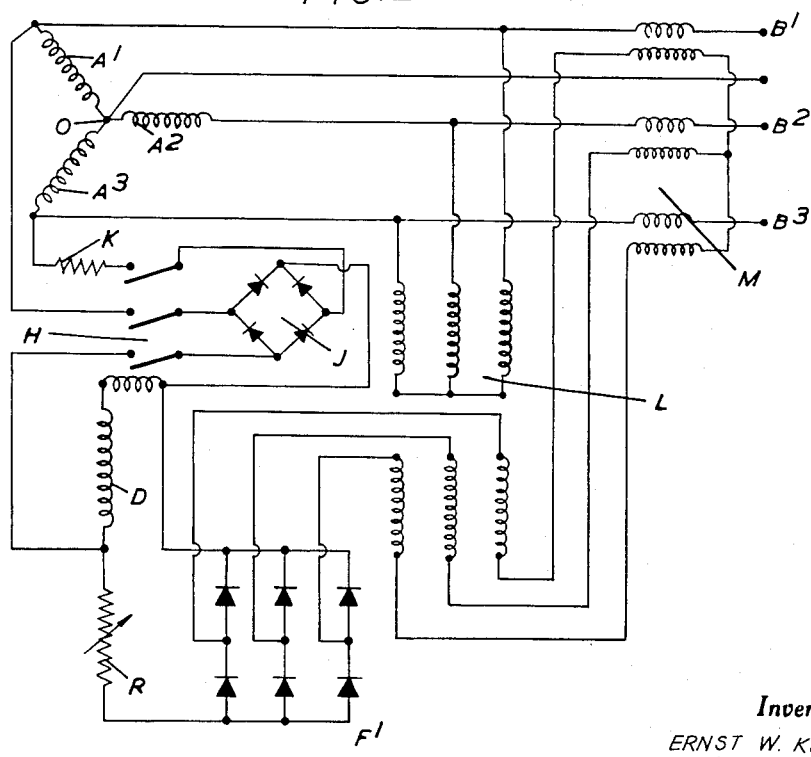
Figure 3:
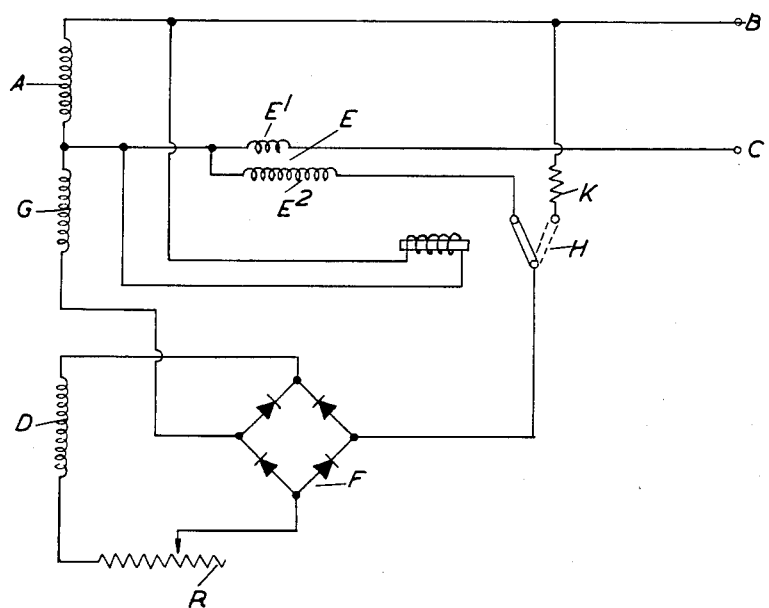
Figure 4:
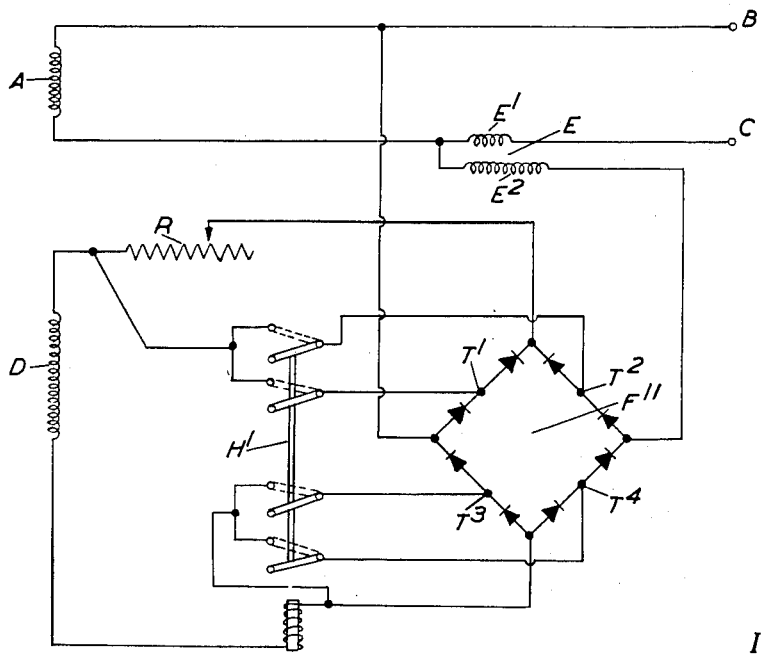

The invention may be carried into practice in various ways but two specific embodiments will now be described by way of example with reference to the accompanying drawings, in which, Figure 1 is a circuit diagram of one form of compensating arrangement according to the invention applied to a single phase alternator, Figure 2 is a circuit diagram of a corresponding arrangement applied to a three-phase alternator, Figure 3 is a circuit diagram of a single-phase arrangement employing only one rectifier and an auxiliary winding on the armature of the machine, and Figure 4 is a circuit diagram of another alternative single-phase arrangement in which a single rectifier is employed having alternative input tappings.

In the embodiment illustrated in Figure 1, the invention is applied to a single phase alternator having a main armature winding A connected to line terminals B and C and a field winding D in series with which is a field regulator R of the variable resistance type. The primary winding $E^1$ of a current transformer E is connected in series with the armature winding A between it and the line terminal C, whilst its secondary winding $E^2$, which may be provided with tappings, is connected to one of the alternating current input terminals of a main rectifier F. This main rectifier is preferably of the dry plate type, for example a selenium rectifier, and is bridge connected for full wave rectification. The other input terminal of the rectifier F is connected to an additional armature winding G coaxial with the main winding A, conveniently accommodated in otherwise unused slots or parts of slots, so that the voltage of this winding G is applied to the main rectifier F.

The direct current output terminals of the main rectifier F are permanently connected to the field winding D in series with the field regulator R and the solenoid of a three-pole relay H.

Thus when the alternator is connected to a load at unity power factor, the line current will be in phase with the line voltage, and with the voltage produced by the coaxial auxiliary winding G. The current transformer primary $E^1$, being inductive, will produce a potential difference across its terminals leading the line current by about 90°, so that the output E. M. F. of the current transformer secondary $E^2$ will lag the line current by 90. This may be converted into an E. M. F. leading by 90° simply by reversing the connections to the secondary winding $E^2$, so that the voltage derived from the secondary winding of the current transformer will lead the voltage derived from the coaxial armature winding G by about 90°. However, when the alternator is connected to a load at zero lagging power factor, the line current will lag 90° behind the armature voltage so that the output voltage of the current transformer secondary $E^2$ will be in phase with the voltage derived from the coaxial armature winding G.

The number of turns of the field winding D is chosen so that at normal speed it will provide the required no-load excitation of the alternator, whilst the current transformer is designed so as to supply excitation equal to or slightly in excess of that required for the alternator under short-circuit conditions. The resultant excitation will then vary with the load and power factor of the alternator so as to produce a substantially constant terminal voltage with the alternator speed either constant or falling slightly with increasing load.

When the machine is started up the voltage produced by the winding G due to the residual magnetism may be insufficient to overcome the internal resistance of the main rectifier F, and hence difficulty may be experienced in building up the excitation.

To overcome this, an initating circuit is provided, which comprises initiating means for applying excitation to the field independently of the rectifier to build up the excitation of the machine from the residual magnetism. The initiating circuit includes an auxiliary rectifier J whose alternating current input terminals are connected, through a limiting resistance K, across both the main armature winding A and the coaxial winding G in series, so that the sum of their E. M. F.'s is applied to the rectifier J. The connection is effected by the closing of the contacts of the relay H, which also serves to connect the direct current output terminals of the auxiliary rectifier J in parallel with the output terminals of the main rectifier F and thus in series with the field winding D through the field regulator R and solenoid of the relay H. With the relay closed, for starting, the auxiliary rectifier output thus provides the excitation current needed when building up the excitation from the residual magnetism. As the alternator speeds up, the increased output current of the auxiliary rectifier J causes the relay H to open and thus cuts out the initiating circuit automatically so that the excitation is then derived from the main rectifier F. The limiting resistance K in series with the input terminals of the auxiliary rectifier J will be chosen so as to keep the starting excitation in the region of its normal value when the voltage builds up.

The auxiliary rectifier J is cut out before the voltage of the alternator builds up to its normal value and can therefore be of lower voltage rating than the main rectifier F so that its internal resistance is also lower. In addition, the voltage applied to the input of the auxiliary rectifier J when starting is derived from the main winding as well as from the coaxial auxiliary winding and so is greater than that applied to the main rectifier F. However, it may prove possible to employ an auxiliary rectifier J whose operating voltage is so low that there is no need to step up the E. M. F. of the coaxial winding in any way in order to overcome the internal resistance when starting.

The circuit of the main certifier F is permanently connected in the field winding circuit without the use of any switch contacts, thereby avoiding variation of the circuit resistance due to wear or irregularities in the switch contacts during normal running. This results in stable voltage regulation and safe building up of excitation. The relay H has its solenoid permanently connected for automatic operation by the direct excitation current.

A generally similar arrangement for a three phase alternator is shown in Figure 2, in which the three armature windings $A^1$, $A^2$ and $A^3$ are connected to line terminals $B^1$, and $B^2$ and $B^3$ and to a common star point O. The field winding D is connected, in series with a field regulator R and with the solenoid of a three-pole relay H, to the direct-current output terminals of a three-phase main rectifier $F^1$. To each of the three input terminals of the rectifier $F^1$ is connected one end of each of the three secondary windings of a three phase voltage transformer L, whose primary windings are connected in star to the three line terminals $B^1$, $B^2$ and $B^3$ respectively of the machine. To the other ends of the three voltage transformer secondary windings are connected the ends of the three secondary windings of a three-phase current transformer M whose other ends are connected together in star. The three primary windings of the current transformer M are connected in series between the three armature windings $A^1$, $A^2$ and $A^3$ and their respective line terminals $B^1$, $B^2$ and $B^3$.

An initiating circuit is provided including an auxiliary rectifier J of single-phase bridge-connected type whose alternating current input terminals are connected in series with a limiting resistance K through the contacts of the relay H to the outer ends of two of the phase windings $A^1$ and $A^3$, and so that when the relay is closed the resultant of two superimposed phases of the alternator E. M. F. is applied to the auxiliary rectifier. The output terminals of the auxiliary rectifier J are connected to the field winding D in series with the solenoid of the relay H but bypassing the field regulator R, so as to avoid the voltage drop which would otherwise occur across the latter.

The embodiment of the invention shown in Figure 3 is a single phase arrangement in which only a single rectifier is employed. In this case the alternator has an armature winding A supplying main terminals B and C and the excitation is afforded by a field winding D. As in the arrangement of Figure 1 the component dependent on load current is derived from a current transformer E and the component dependent on voltage is derived from a coaxial auxiliary winding G, and these two components are supplied during normal running to a bridge rectifier F, whose rectified output is connected to the field winding through a field regulator R.

In this case however the initiating means is connected to the input of the rectifier F, and in order to ensure self-excitation the voltage supplied by the initiating circuit when the relay H is in the starting position is considerably greater than that which would be supplied when starting by the main armature at the same residual flux. This is achieved by connecting the initiating circuit across both the main and the auxiliary windings A and G in series, so that the voltage derived therefrom is sufficient to overcome the internal resistance of the rectifier F when starting.

Other means may be employed for increasing the ratio of applied voltage to rectifier impedance when starting. Thus the initiating circuit may be supplied through a step-up transformer, or the normal excitation current may be supplied through a step-down transformer which is cut out when starting, the initiating circuit connecting the rectifier directly across the terminals of the machine. Various combinations of these arrangements may be employed. In polyphase systems the initiating circuit may be connected across more than one phase. Alternatively the rectifier may be normally supplied with a component derived from a step-down star connected autotransformer, and the initiating circuit may include switch means for disconnecting the star connection so that the rectifier will be connected to the phase terminals through parts of the transformer windings functioning as current-limiting chokes.

Another alternative arrangement is shown in Figure 4. In this single phase arrangement, a single bridge rectifier F¹¹ only is used, but this rectifier is provided with intermediate tappings, T¹, T², T³, and T⁴ dividing each branch of the rectifier bridge so that only a very few rectifier cells, perhaps three or four, lie between each tapping and the adjacent alternating current terminal of the rectifier. The tappings T¹, T², T³, and T⁴ are connected in pairs to corresponding pairs of contacts of a four-pole magnetic relay H¹, whose other contacts are connected together in pairs and in series with the field winding D. Thus when the relay H¹ is in its position for normal running, the whole of the rectifier R¹¹ is employed for rectifying the excitation current, whereas when the relay is in its initiating or starting position the tappings T¹ and T², and the tappings T³ and T⁴, are connected together by it so as to reduce the number of rectifier cells in circuit and to reduce the rectifier impendance to a value low enough to permit self-excitation, without the necessity for stepping up the applied voltage derived from the residual magnetism. Thus an exciting current will flow from the tappings T¹, T², T³, and T⁴ through the relay contacts, the field winding and the relay solenoid, and this results in the build-up of the field of the alternator. As soon as the armature voltage reaches a value in the neighbourhood of the rated voltage, the relay H¹ wil by virtue of the increased field current change it contacts to the normal running position and so break the initiating current. Since the armature voltage is now sufficiently high to overcome the internal resistance of the whole rectifier F¹¹, the field current continues to flow and to hold the relay in its normal running position. During the period of initiating self-excitation the field regulator R is bypassed to reduce the resistance of the field circuit and the secondary winding E² of the current transformer is used as a series impedance to limit the input current to the rectifier.

The precise extent to which the ratio of the applied voltage to rectifier impedance must be increased during initiation in order to ensure self-excitation will of course depend on the rectifier characteristics, but in general this ratio should be at least doubled and may have to be increased up to five or six times. However it is possible that in due course improved rectifiers may become available whose internal resistance is so low as to permit satisfactory results to be obtained with lower increases in this ratio.

What I claim by my invention and desire to secure by Letters Patent is:

1. An excitation system for an alternator having armature winding means and field winding means, comprising in combination main rectifier means the output of which is permanently connected to the field winding means to supply direct current thereto, and auxiliary rectifier means of lower voltage rating than the main rectifier means, the output of which is initially connected to said field winding means and in parallel with the output of said main rectifier means, a main exciting circuit connecting the armature winding means to said main rectifier means and including devices to supply to the input thereof the resultant of two alternating current components respectively dependent on the terminal voltage and on the load current of the alternator whereby said main rectifier means output supplies exciting current to the field winding means during normal running of the alternator, and an excitation initiation circuit connecting said armature winding means to said auxiliary rectifier means to supply to the input thereof alternating current derived from the residual voltage of the alternator and independently of said devices, whereby said auxiliary rectifier means output supplies initial excitation current to the field winding means during starting, and normally closed switch means connecting said auxiliary rectifier means to the field winding means, and operating means in series with said field winding, said operating means upon the attainment during starting of an initial excitation current of preset value in the field winding means, opening said normally closed switch means, and disconnecting said auxiliary rectifier means from said field winding means.

2. A system in accordance with claim 1 wherein the operating means comprises an operating coil and is automatically operated to open the normally closed switch means when the excitation current developed in the field windings attains a predetermined value.

3. A system in accordance with claim 1 in which a current limiting means in connected in the excitation circuit between the armature winding means and the input of the auxiliary rectifier means.

4. A system in accordance with claim 1, wherein the alternator is a single phase alternator and wherein the operating means comprises an operating coil and wherein the current supplied to the input of the auxiliary rectifier means is derived in part from an armature winding coaxial with said first named armature winding means.

5. A system in accordance with claim 1, wherein the alternator is a single phase alternator and wherein the operating means comprises an operating coil wherein the current supplied to the input of the auxiliary rectifier means is derived in part from an armature winding coaxial with said first named armature winding means, and wherein the coaxial armature winding is disposed in armature slots other than those in which the first named armature winding means is disposed.

6. A system in accordance with claim 1, wherein the alternator is a polyphase alternator and wherein the main rectifier means input is connected across three phases while the auxiliary rectifier means input is connected across a single phase.

7. A system in accordance with claim 1, wherein the alternator is a polyphase alternator and wherein the main rectifier means input is connected across phases while the auxiliary rectifier means input is connected across two of the three phases of the armature winding means.

References Cited in the file of this patent

UNITED STATES PATENTS 2,208,416    Friedlander et al. _____ July 16, 1940